US011784356B2

(12) United States Patent
Kwon et al.

(10) Patent No.: US 11,784,356 B2
(45) Date of Patent: Oct. 10, 2023

(54) BATTERY MODULE

(71) Applicant: LG CHEM, LTD., Seoul (KR)

(72) Inventors: Jae Kuk Kwon, Daejeon (KR); Jin Seob Kim, Daejeon (KR); Suk Jin Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/763,420

(22) PCT Filed: Oct. 25, 2019

(86) PCT No.: PCT/KR2019/014169
§ 371 (c)(1),
(2) Date: May 12, 2020

(87) PCT Pub. No.: WO2020/101216
PCT Pub. Date: May 22, 2020

(65) Prior Publication Data
US 2021/0265668 A1    Aug. 26, 2021

(30) Foreign Application Priority Data

Nov. 15, 2018 (KR) ........................ 10-2018-0140382

(51) Int. Cl.
*H01M 10/42* (2006.01)
*H01M 50/105* (2021.01)
(Continued)

(52) U.S. Cl.
CPC ..... *H01M 10/425* (2013.01); *H01M 10/4207* (2013.01); *H01M 50/105* (2021.01);
(Continued)

(58) Field of Classification Search
None
See application file for complete search history.

(56) References Cited

U.S. PATENT DOCUMENTS 8,518,575 B2    8/2013  Chung et al.
9,520,620 B2   12/2016  Bang et al.
(Continued)

FOREIGN PATENT DOCUMENTS

CN    102918681 A    2/2013
CN    103650211 A    3/2014
(Continued)

OTHER PUBLICATIONS

Extended European Search Report for European Application No. 19884586.9, dated Mar. 12, 2021.
(Continued)

*Primary Examiner* — Alix E Eggerding
(74) *Attorney, Agent, or Firm* — Birch, Stewart, Kolasch & Birch, LLP

(57) ABSTRACT

Disclosed is a battery module including a battery cell, a protection circuit module coupled integrally to the battery cell, the protection circuit module having a thermal cut-out element formed integrally therewith, a battery management unit connected to the protection circuit module, and a connection unit to detachably connect the protection circuit module and the battery management unit to each other.

12 Claims, 3 Drawing Sheets

(51) Int. Cl.
*H01M 50/211* (2021.01)
*H01M 50/284* (2021.01)
*H01M 50/202* (2021.01)
*H01M 50/119* (2021.01)

(52) U.S. Cl.
CPC ....... *H01M 50/202* (2021.01); *H01M 50/211* (2021.01); *H01M 50/284* (2021.01); *H01M 50/119* (2021.01); *H01M 2010/4271* (2013.01)

(56) References Cited

U.S. PATENT DOCUMENTS

| | | | |
|---|---|---|---|
| 10,374,200 | B2 | 8/2019 | Choi et al. |
| 2004/0234848 | A1 | 11/2004 | Chung et al. |
| 2006/0051668 | A1 | 3/2006 | Chung et al. |
| 2008/0081249 | A1 | 4/2008 | Kaneko |
| 2010/0247979 | A1 | 9/2010 | Ha et al. |
| 2011/0039129 | A1 | 2/2011 | Lee et al. |
| 2013/0157085 | A1 | 6/2013 | Bang et al. |
| 2013/0200700 | A1 | 8/2013 | Ohkura et al. |
| 2013/0238530 | A1 | 9/2013 | Zhao |
| 2013/0342213 | A1 | 12/2013 | Seol |
| 2014/0072858 | A1 | 3/2014 | Won et al. |
| 2014/0127549 | A1 | 5/2014 | Roh et al. |
| 2014/0141289 | A1 | 5/2014 | Choi et al. |
| 2014/0141301 | A1* | 5/2014 | Aoki ................ H01M 10/482 429/90 |
| 2015/0111076 | A1* | 4/2015 | Suzuki ............... H02J 7/0021 429/90 |
| 2015/0162650 | A1* | 6/2015 | Ahn .................... H01M 10/48 429/90 |
| 2016/0049696 | A1 | 2/2016 | Choi |
| 2016/0218533 | A1* | 7/2016 | Lim ..................... H01M 10/46 |
| 2017/0033333 | A1 | 2/2017 | Choi et al. |
| 2017/0033335 | A1* | 2/2017 | Kojima ............... H01M 50/211 |
| 2018/0097260 | A1* | 4/2018 | Han .................... H01M 50/126 |

FOREIGN PATENT DOCUMENTS

| | | |
|---|---|---|
| EP | 2 541 641 A1 | 1/2013 |
| JP | 2002-42937 A | 2/2002 |
| JP | 2004-95357 A | 3/2004 |
| JP | 2008-41292 A | 2/2008 |
| JP | 2010-503971 A | 2/2010 |
| JP | 2011-171114 A | 9/2011 |
| JP | 2014-56809 A | 3/2014 |
| JP | 2014-526124 A | 10/2014 |
| JP | 2016-162717 A | 9/2016 |
| JP | 2017-515264 A | 6/2017 |
| JP | 2018-98150 A | 6/2018 |
| KR | 10-2004-0100264 A | 12/2004 |
| KR | 10-2006-0083572 A | 7/2006 |
| KR | 10-2011-0130848 A | 12/2011 |
| KR | 10-2012-0100195 A | 9/2012 |
| KR | 10-2013-0117289 A | 10/2013 |
| KR | 10-2014-0050293 A | 4/2014 |
| KR | 10-2014-0093865 A | 7/2014 |
| KR | 10-1539691 B1 | 7/2015 |
| KR | 10-2016-0020284 A | 2/2016 |
| WO | WO 2011/105095 A1 | 9/2011 |

OTHER PUBLICATIONS

Partial Supplementary European Search Report for European Application No. 19884586.9, dated Dec. 18, 2020.

* cited by examiner

BATTERY MODULE

TECHNICAL FIELD

This application claims the benefit of priority to Korean Patent Application No. 2018-0140382 filed on Nov. 15, 2018, the disclosure of which is hereby incorporated by reference herein its entirety.

The present invention relates to a battery module.

BACKGROUND ART

In recent years, with an increase in the demand for portable electronic devices, such as laptop computers, smartphones, and tablet computers, research has been actively conducted on high-performance secondary batteries that are capable of being repeatedly charged and discharged.

In addition, secondary batteries have come to be widely used in medium- or large-sized devices, such as vehicles, robots, and satellites, as well as small-sized devices, such as portable electronic devices. In particular, as fossil fuels are being depleted and increasing attention is being paid to environmental pollution, research on hybrid vehicles and electric vehicles is being actively conducted. The most essential part of a hybrid vehicle or an electric vehicle is a battery pack configured to supply electric power to a motor. The battery pack includes a battery module including a plurality of battery cells, wherein the plurality of battery cells is connected to each other in series and/or in parallel, whereby the capacity and output of the battery module are increased.

Basically, a battery cell is manufactured through a process of stacking a plurality of electrode plates in the state in which a separator is disposed therebetween and welding a plurality of electrode tabs to the plurality of electrode plates, respectively, to form an electrode assembly and then wrapping the electrode assembly in an aluminum pouch so as to be sealed.

A battery cell has various combustible materials therein, and therefore there is a danger in which, during use of a battery, the battery may catch fire or explode due to overcharge, overdischarge, overcurrent, heating, or consecutive side reaction of battery cells.

Therefore, it is necessary to protect the battery cells while continuously detecting voltage, current, temperature, etc. of the battery cells. Each of the battery cells is protected by a safety element, such as a positive temperature coefficient (PTC) element, a protection circuit module (PCM), or a thermal cut-out (TCO) element, and the safety element is controlled by a battery management unit (BMU).

To this end, each of the battery cells is coupled to the battery management unit by welding (for example, resistance welding, laser welding, or spot welding) so as to be electrically connected thereto in order to prevent overcharge, overdischarge, or overcurrent of the battery cell. Since the battery cell is coupled to the battery management unit by welding, however, the entirety of a battery module including the battery cell must be discarded in the case in which welding defect occurs between the battery cell and the battery management unit. As a result, part loss occurs, and cost of manufacturing the battery module increases. In addition, since it is necessary to provide a protection circuit module with a welding pad required for a welding process, there is a problem in that the size of the battery module increases corresponding to the size of the portion that is occupied by the welding pad. In addition, there are problems in that separate welding equipment is required to perform welding between the battery cell and the battery management unit and in that welding conditions must be continuously managed.

DISCLOSURE

Technical Problem

The present invention has been made in view of the above problems, and it is an object of the present invention to provide a battery module configured such that a protection circuit module and a battery management unit are connected to each other without welding.

Technical Solution

A battery module according to an embodiment of the present invention provided to accomplish the above object may include a battery cell, a protection circuit module coupled integrally to the battery cell, the protection circuit module having a thermal cut-out element formed integrally therewith, a battery management unit connected to the protection circuit module, and a connection unit configured to detachably connect the protection circuit module and the battery management unit to each other.

The connection unit may include a plug connected to one of the protection circuit module and the battery management unit, and a socket provided in the other of the protection circuit module and the battery management unit, the socket being configured such that the plug is separably inserted into the socket.

The battery module according to the embodiment of the present invention may further include a thermal cut-out element coupled integrally to the protection circuit module.

The battery cell may be connected to the protection circuit module via the thermal cut-out element.

A battery module according to another embodiment of the present invention provided to accomplish the above object may include a plurality of battery cells, a plurality of protection circuit modules coupled respectively to the plurality of battery cells, a battery management unit connected to the plurality of protection circuit modules, and a plurality of connection units configured to detachably connect the plurality of protection circuit modules to the battery management unit and to interconnect the plurality of protection circuit modules.

Each of the plurality of connection units may include a first connection unit configured to connect a corresponding one of the protection circuit modules to the battery management unit, and a second connection unit configured to interconnect a pair of protection circuit modules, among the plurality of protection circuit modules, the first connection unit may include a first plug connected to one of the corresponding one of the protection circuit modules and the battery management unit via a first connection line, and a first socket provided in the other of the corresponding one of the protection circuit modules and the battery management unit, the first socket being configured such that the first plug is inserted into the first socket, and the second connection unit may include a second plug connected to one of the pair of protection circuit modules via a second connection line, and a second socket provided in the other of the pair of protection circuit modules, the second socket being configured such that the second plug is inserted into the second socket.

The battery module according to the embodiment of the present invention may further include a thermal cut-out element coupled integrally to each of the protection circuit modules.

Each of the battery cells may be connected to a corresponding one of the protection circuit modules via the thermal cut-out element.

Each of the battery cells may include an electrode assembly configured such that a plurality of electrode plates is stacked in the state in which a separator is disposed between the electrode plates, and a pouch configured to wrap the electrode assembly.

BEST MODE

Hereinafter, battery modules according to embodiments of the present invention will be described in detail with reference to the accompanying drawings.

Figure 1:
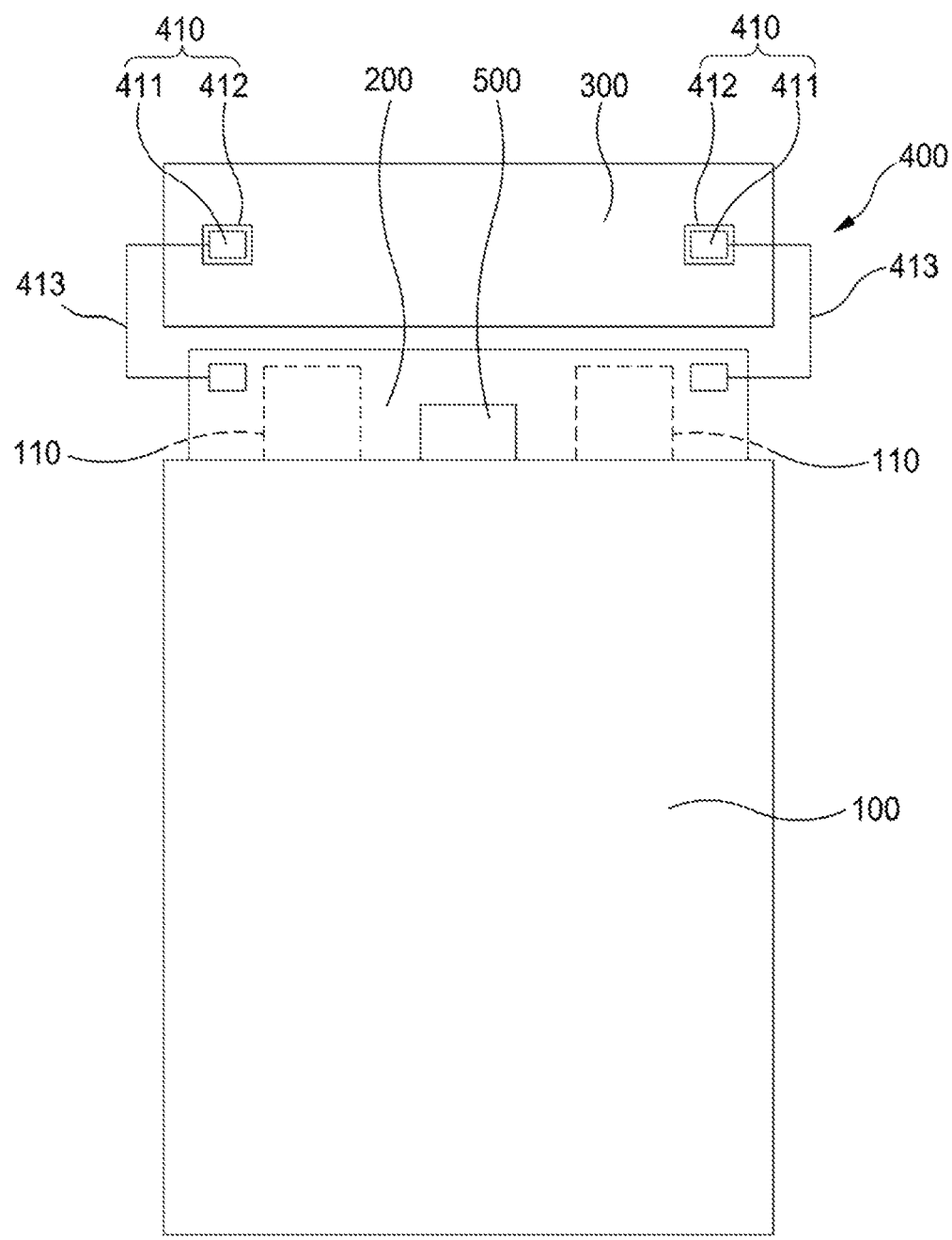
FIG. 1 is a view schematically showing a battery module according to a first embodiment of the present invention.
Figure 2:
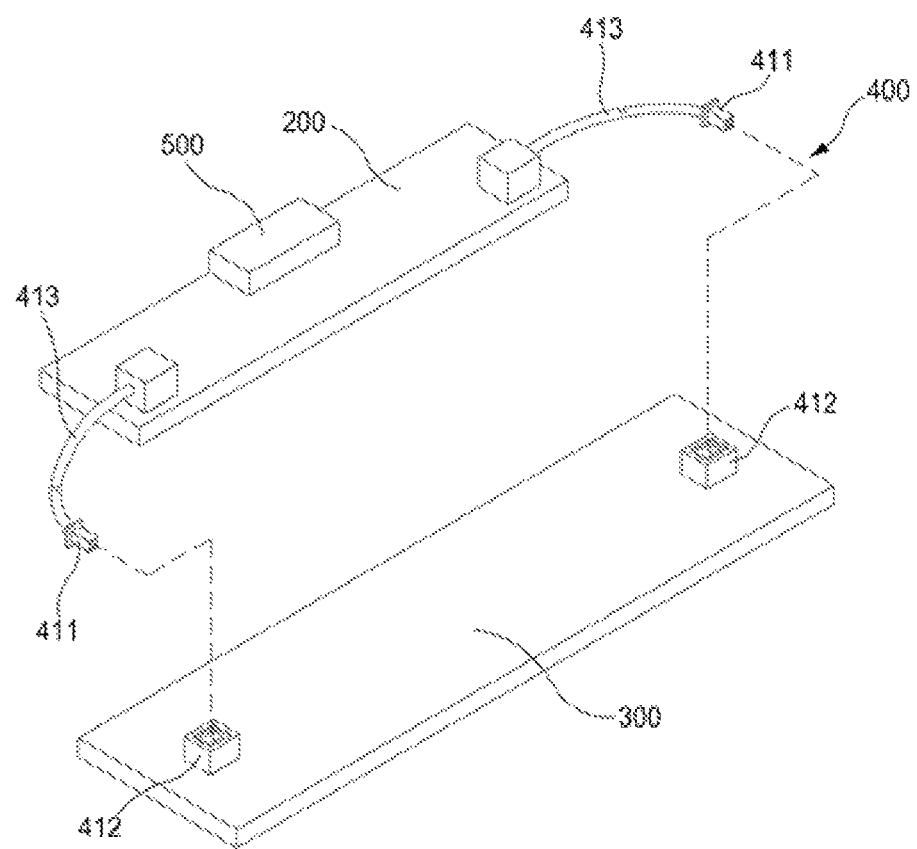
FIG. 2 is a perspective view schematically showing a protection circuit module and a battery management unit provided in the battery module according to the first embodiment of the present invention.

As shown in FIGS. 1 and 2, a battery module according to a first embodiment of the present invention may include a battery cell 100 having a pair of electrode terminals 110, a protection circuit module 200 connected to the battery cell 100, a battery management unit 300 connected to the protection circuit module 200, and a connection unit 400 configured to detachably connect the protection circuit module 200 and the battery management unit 300 to each other.

The battery cell 100 is manufactured through a process of stacking a plurality of electrode plates in the state in which a separator is disposed therebetween and welding a plurality of electrode tabs to the plurality of electrode plates, respectively, to form an electrode assembly and then wrapping the electrode assembly in an aluminum pouch so as to be sealed.

The protection circuit module 200 is electrically connected to the electrode terminals 110 of the battery cell 100 in order to prevent overheating and explosion of the battery cell 100 due to overcharge, overdischarge, and/or overcurrent of the battery cell 100. The protection circuit module 200 may be a printed circuit board. The protection circuit module 200 may be coupled integrally to the battery cell 100. For example, the protection circuit module 200 may be coupled integrally to the battery cell 100 by spot welding.

The protection circuit module 200 may be designed such that the positions of terminals thereof correspond to the positions of the electrode terminals 110 of the battery cell 100, whereby the protection circuit module 200 is commonly applicable to a plurality of battery cells 100.

The battery cell 100 may be connected to the protection circuit module 200 via a thermal cut-out element 500. The protection circuit module 200 and the thermal cut-out element 500 may be configured as a single body. The thermal cut-out element 500 may be constituted by a temperature fuse, which may be coupled to the protection circuit module 200 by welding. In the case in which a predetermined temperature is sensed when the battery cell 100 is overheated, the thermal cut-out element 500 transmits a signal in order to prevent the occurrence of a safety-related accident due to overheating of the battery cell 100.

The battery management unit 300 serves to control charging and discharging of the battery cell 100. The battery management unit 300 may be a printed circuit board. The battery management unit 300 may be connected to the battery cell 100 via the protection circuit module 200.

The connection unit 400 serves to detachably connect the protection circuit module 200 to the battery management unit 300 without welding. The connection unit 400 may include a first plug 411 connected to the protection circuit module 200 via a first connection line 413 and a first socket 412 provided in the battery management unit 300, the socket being configured such that the first plug 411 is separably inserted into the socket.

The first connection line 413 may be constituted by a connection wire configured to connect the first plug 411 to the protection circuit module 200.

The first plug 411 and the first socket 412 may be connected to each other using a male-female connection method. A plurality of electrodes may be provided in each of the first plug 411 and the first socket 412, and the pluralities of electrodes may be electrically connected to each other when the first plug 411 is inserted into the first socket 412.

As the result of the first plug 411 being inserted into the first socket 412, the protection circuit module 200 and the battery management unit 300 may be electrically and mechanically connected to each other.

Meanwhile, in the first embodiment of the present invention, the construction in which the first plug 411 is connected to the protection circuit module 200 and the first socket 412 is provided in the battery management unit 300 is presented; however, the present invention is not limited thereto. The first plug 411 may be connected to the battery management unit 300, and the first socket 412 may be provided in the protection circuit module 200.

In the battery module according to the first embodiment of the present invention, the protection circuit module 200 and the battery management unit 300 may be electrically and mechanically connected to each other by inserting the first plug 411 into the first socket 412. Consequently, the protection circuit module 200 and the battery management unit 300 are connected to each other using a method other than welding, whereby it is possible to easily perform a process of assembling the battery module. Also, in the case in which defect occurs during assembly of the battery module, the first plug 411 connected to the protection circuit module 200 of a defective battery cell 100 may be simply separated from the first socket 412 of the battery management unit 300, and then the defective battery cell 100 may be replaced with a new one, whereby it is possible to prevent part loss, compared to the case in which the entire battery module is discarded.

In addition, it is not necessary to provide the protection circuit module 200 with a welding pad required for a welding process. Consequently, it is possible to reduce the size of the battery module corresponding to the size of the portion that is occupied by the welding pad.

Hereinafter, a battery module according to a second embodiment of the present invention will be described with reference to FIG. 3. Components identical to those described in the first embodiment of the present invention are denoted by the same reference numerals, and a detailed description thereof will be omitted.

Figure 3:
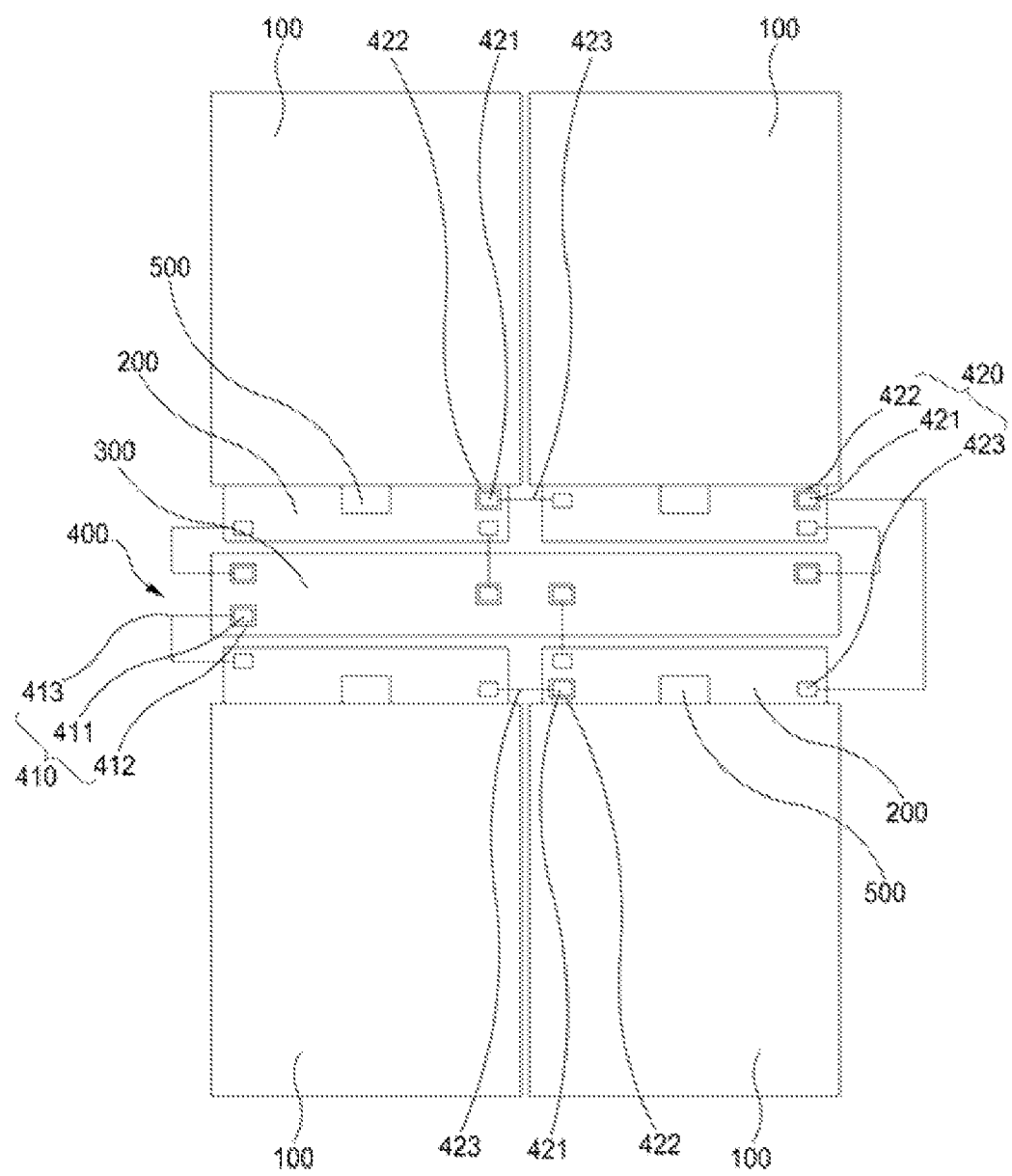
FIG. 3 is a view schematically showing a battery module according to a second embodiment of the present invention.

As shown in FIG. 3, the battery module according to the second embodiment of the present invention is configured such that a plurality of battery cells 100 is connected to a single battery management unit 300.

A plurality of protection circuit modules 200 is connected to the plurality of battery cells 100, respectively. Each of the protection circuit modules 200 is connected to a corresponding one of the battery cells 100 in order to prevent overheating and explosion of the battery cell 100 due to overcharge, overdischarge, and/or overcurrent of the battery cell 100. Each of the protection circuit modules 200 may be coupled integrally to a corresponding one of the battery cells 100. For example, each of the protection circuit modules 200 may be coupled integrally to a corresponding one of the battery cells 100 by spot welding.

The battery management unit 300 serves to control charging and discharging of each battery cell 100. The battery management unit 300 may be connected to each of the battery cells 100 via a corresponding one of the protection circuit modules 200.

The battery module according to the second embodiment of the present invention may include a plurality of connection units 400 configured to detachably connect the plurality of protection circuit modules 200 to the battery management unit 300 and to interconnect the plurality of protection circuit modules 200.

Each of the plurality of connection units 400 may include a first connection unit 410 configured to connect a corresponding one of the protection circuit modules 200 to the battery management unit 300 and a second connection unit 420 configured to interconnect a pair of protection circuit modules 200, among the plurality of protection circuit modules 200.

The first connection unit 410 serves to detachably connect the protection circuit module 200 to the battery management unit 300 without welding. The first connection unit 410 may include a first plug 411 connected to the protection circuit module 200 via a first connection line 413 and a first socket 412 provided in the battery management unit 300, the first socket being configured such that the first plug 411 is separably inserted into the first socket. The first connection line 413 may be constituted by a connection wire configured to connect the first plug 411 to the protection circuit module 200. As the result of the first plug 411 being inserted into the first socket 412, the protection circuit module 200 and the battery management unit 300 may be electrically and mechanically connected to each other.

Meanwhile, in the second embodiment of the present invention, the construction in which the first plug 411 is connected to the protection circuit module 200 and the first socket 412 is provided in the battery management unit 300 is presented; however, the present invention is not limited thereto. The first plug 411 may be connected to the battery management unit 300, and the first socket 412 may be provided in the protection circuit module 200.

The second connection unit 420 serves to detachably connect the plurality of protection circuit modules 200 to each other without welding. The second connection unit 420 may include a second plug 421 connected to one of a pair of protection circuit modules 200 via a second connection line 423 and a second socket 422 provided in the other of the pair of protection circuit modules 200, the second socket being configured such that the second plug 421 is separably inserted into the second socket. The second connection line 423 may be constituted by a connection wire configured to connect the second plug 421 to the protection circuit module 200. As the result of the second plug 421 being inserted into the second socket 422, the pair of protection circuit modules 200 may be electrically and mechanically connected to each other.

In the battery module according to the second embodiment of the present invention, each of the protection circuit modules 200 and the battery management unit 300 may be electrically and mechanically connected to each other by inserting the first plug 411 into the first socket 412. Consequently, each of the protection circuit modules 200 and the battery management unit 300 are connected to each other using a method other than welding, whereby it is possible to easily perform a process of assembling the battery module.

Also, in the battery module according to the second embodiment of the present invention, the plurality of protection circuit modules 200 may be electrically and mechanically connected to each other by inserting the second plug 421 into the second socket 422. Consequently, the plurality of protection circuit modules 200 is connected to each other using a method other than welding, whereby it is possible to easily perform a process of assembling the battery module. In addition, the plurality of protection circuit modules 200 may be easily connected to or disconnected from each other by inserting the second plug 421 into the second socket 422 or separating the second plug 421 from the second socket 422, whereby it is possible to easily change series connection and parallel connection between the plurality of battery cells 100.

The preferred embodiments of the present invention have been described illustratively; however, the scope of the present invention is not limited to such specific embodiments, and may be appropriately changed within the category described in the claims.

DESCRIPTION OF REFERENCE NUMERALS

100: Battery cell
200: Protection circuit module
300: Battery management unit
400: Connection unit
411, 421: First and second plugs
412, 422: First and second sockets
500: Thermal cut-out element

INDUSTRIAL APPLICABILITY

In a battery module according to an embodiment of the present invention, a protection circuit module and a battery management unit may be electrically and mechanically connected to each other by inserting a first plug into a first socket. Consequently, the protection circuit module and the battery management unit are connected to each other using a method other than welding, whereby it is possible to easily perform a process of assembling the battery module.

In a battery module according to an embodiment of the present invention, a plurality of protection circuit modules may be electrically and mechanically connected to each other by inserting a second plug into a second socket. Consequently, the plurality of protection circuit modules may be connected to each other using a method other than welding, whereby it is possible to easily perform a process of assembling the battery module. In addition, the plurality of protection circuit modules may be easily connected to or disconnected from each other by inserting the second plug into the second socket or separating the second plug from the second socket, whereby it is possible to easily change series connection and parallel connection between a plurality of battery cells.

The invention claimed is:

1. A battery module comprising
a battery cell;
a protection circuit module coupled integrally to the battery cell, the protection circuit module having a thermal cut-out element formed integrally therewith;
a battery management unit connected to the protection circuit module; and
a connection unit configured to detachably connect the protection circuit module and the battery management unit to each other,
wherein the connection unit provides current of the battery cell from the protection circuit module to the battery management unit,
wherein the connection unit comprises:
plugs connected to the protection circuit module; and
sockets provided on the battery management unit, the sockets being configured such that the plugs are detachably inserted into the sockets, and
wherein the sockets provided on the battery management unit are located on longitudinally opposite ends of the battery management unit, and protrudes perpendicularly from a longitudinal surface of the battery management unit, the longitudinal surface having a greatest surface area among all surfaces of the battery management unit.

2. The battery module according to claim 1, wherein the plug or the socket is connected to the protection circuit module or the battery management unit via a connection wire.

3. The battery module according to claim 1, wherein the battery cell is connected to the protection circuit module via the thermal cut-out element.

4. A battery pack comprising the battery module according to claim 1.

5. The battery module according to claim 1, wherein the thermal cut-out element transmits a signal when the at least one battery cell is sensed as overheated.

6. A battery module comprising
a plurality of battery cells;
a plurality of protection circuit modules coupled respectively to the plurality of battery cells;
a thermal cut-out element coupled integrally to the plurality of protection circuit modules, respectively;
a battery management unit connected to the plurality of protection circuit modules; and
a plurality of connection units configured to detachably connect the plurality of protection circuit modules to the battery management unit and to interconnect the plurality of protection circuit modules,
wherein the plurality of connection units provide current of the plurality of battery cells from the plurality of protection circuit modules to the battery management, unit,
wherein each of the plurality of connection units comprises:
a first connection unit configured to connect a corresponding one of the plurality of protection circuit modules to the battery management unit; and
a second connection unit configured to interconnect a pair of protection circuit modules, among the plurality of protection circuit modules,
wherein the first connection unit comprises:
a first plug connected to one of the plurality of protection circuit modules via a first connection line; and
a first socket provided in the battery management unit, the first socket being configured such that the first plug is detachably inserted into the first socket, and
wherein the second connection unit comprises:
a second plug connected to one of the pair of protection circuit modules via a second connection line; and
a second socket provided in the other of the pair of protection circuit modules, the second socket being configured such that the second plug is detachably inserted into the second socket, and
wherein the first socket provided on the battery management unit is located on longitudinally opposite ends of the battery management unit, and protrudes perpendicularly from a longitudinal surface of the battery management unit, the longitudinal surface having a greatest surface area among all surfaces of the battery management unit.

7. The battery module according to claim 6, wherein each of the battery cells is connected to a corresponding one of the plurality of protection circuit modules via the thermal cut-out element.

8. The battery module according to claim 6, wherein each of the battery cells comprises:
an electrode assembly configured such that a plurality of electrode plates is stacked in a state in which a separator is disposed between the plurality of electrode plates; and
a pouch configured to wrap the electrode assembly.

9. A battery pack comprising the battery module according to claim 6.

10. The battery module according to claim 6, wherein the thermal cut-out element transmits a signal to when the at least one battery cell is sensed as overheated.

11. A battery module comprising:
a plurality of battery cells;
a plurality of protection circuit modules coupled respectively to the plurality of battery cells;
a thermal cut-out element coupled integrally to the plurality of protection circuit modules, respectively;
a battery management unit connected to the plurality of protection circuit modules; and
a plurality of connection units configured to detachably connect the plurality of protection circuit modules to the battery management unit and to interconnect the plurality of protection circuit modules,
wherein each of the plurality of connection units comprises:
a first connection unit configured to connect a corresponding one of the plurality of protection circuit modules to the battery management unit; and
a second connection unit configured to interconnect a pair of protection circuit modules, among the plurality of protection circuit modules,
wherein the first connection unit comprises:
a first plug connected to one of the corresponding one of the plurality of protection circuit modules and the battery management unit via a first connection line; and
a first socket provided in the other of the corresponding one of the plurality of protection circuit modules and the battery management unit, the first socket being configured such that the first plug is detachably inserted into the first socket,
wherein the second connection unit comprises:
a second plug connected to one of the pair of protection circuit modules via a second connection line; and
a second socket provided in the other of the pair of protection circuit modules, the second socket being configured such that the second plug is detachably inserted into the second socket, wherein the second connection unit connects the plurality of battery cells in series or parallel, and wherein sockets provided on the battery management unit are located on longitudinally opposite ends of the battery management unit, and protrudes perpendicularly from a longitudinal surface of the battery management unit, the longitudinal surface having a greatest surface area among all surfaces of the battery management unit.

12. The battery module according to claim 11, wherein the thermal cut-out element transmits a signal when the at least one battery cell is sensed as overheated.

* * * * *